(12) United States Patent
Yanagi et al.

(10) Patent No.: US 7,921,637 B2
(45) Date of Patent: Apr. 12, 2011

(54) HIGH BYPASS-RATIO TURBOFAN JET ENGINE

(75) Inventors: Ryoji Yanagi, Tokyo (JP); Hitoshi Fujiwara, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 78 days.

(21) Appl. No.: 12/392,203

(22) Filed: Feb. 25, 2009

(65) Prior Publication Data

US 2009/0226297 A1    Sep. 10, 2009

(30) Foreign Application Priority Data

Mar. 7, 2008 (JP) ................. 2008-057474

(51) Int. Cl.
 *F02K 3/02* (2006.01)
(52) U.S. Cl. ........................ 60/226.1; 60/262
(58) Field of Classification Search .......... 60/226.1, 60/226.2, 226.3, 262, 263, 269
See application file for complete search history.

(56) References Cited

U.S. PATENT DOCUMENTS

| 3,117,748 | A | | 1/1964 | Gerlaugh | |
|---|---|---|---|---|---|
| 3,316,717 | A | * | 5/1967 | Castle et al. | 60/226.3 |
| 3,968,647 | A | * | 7/1976 | Boudigues | 60/262 |
| 5,058,379 | A | * | 10/1991 | Lardellier | 60/226.1 |
| 5,383,332 | A | | 1/1995 | Angel | |
| 6,351,940 | B1 | | 3/2002 | Guinan et al. | |
| 2005/0178890 | A1 | | 8/2005 | Bacon | |
| 2008/0075580 | A1 | * | 3/2008 | Yanagi et al. | 415/119 |

OTHER PUBLICATIONS

European Search Report dated Jun. 8, 2010, issued in corresponding European Patent Application No. 09153344.8.

* cited by examiner

*Primary Examiner* — Louis Casaregola
(74) *Attorney, Agent, or Firm* — Westerman, Hattori, Daniels & Adrian, LLP

(57) ABSTRACT

To provide a turbofan jet engine which is capable of increasing the bypass ratio without increasing the fan diameter, and of reducing air resistance acting on the engine, a front fan duct that discharges air compressed by a front fan to the atmosphere and an aft fan duct that introduces air into an aft fan are disposed such as to change cross-sectional shapes thereof by rotating around a core engine in a counterclockwise direction, so that the cross-sectional geometric relationship between the front fan duct and the aft fan duct at a position immediately posterior to the front fan and a cross-sectional geometric relationship between the front fan duct and the aft fan duct at a position immediately anterior to the aft fan are inverted.

5 Claims, 5 Drawing Sheets

HIGH BYPASS-RATIO TURBOFAN JET ENGINE

BACKGROUND OF THE INVENTION

1. Field of the Invention

The present invention relates to a high bypass-ratio turbofan jet engine, and more particularly to a high bypass-ratio turbofan jet engine which is capable of increasing the bypass ratio without increasing the fan diameter, and of reducing air resistance acting on the engine.

2. Description of the Related Art

In a turbofan jet engine that is widely used in aircraft flying at subsonic speeds, generally, the larger the ratio between the quantity of air passing through a core part and the quantity of air passing through a fan part (bypass ratio), the closer the exhaust velocity to the cruising speed and the higher the propulsion efficiency. Therefore, an engine with high bypass ratio tends to have improved fuel consumption and generate low jet noise. However, an engine with a larger fan has the following problems. First, the weight of moving and stationary blades and fan case/nacelle is large. Secondly, due to the large engine diameter, the main landing gears need to be made long to maintain a predetermined or more distance between the ground and the engines in the case of aircraft with the engines beneath the wings. Thirdly, when the flow rate on the outer circumference is kept lower than or equal to a predetermined flow rate in order to maintain the fan efficiency, the rotation speed of the engine of the large-diameter fan is reduced and the rotation speed of low-pressure turbines rotating coaxially with the fan is also reduced, degrading the efficiency of the low-pressure turbines. As one of the measures to improve these problems, research and development is carried out on a deceleration type turbofan jet engine (Geared Turbofan) which is provided with a speed reduction mechanism between low-pressure turbines and a fan and optimizes the rotation speed of the fan and turbines. In this turbofan jet engine, however, it is considered that, when thrust is increased to a predetermined level or higher, the impact of increase in weight of the speed reduction mechanism and its lubrication system or the loss of shaft power is more significant than the effect of improvement of fuel consumption.

Although an unducted fan without a nacelle and an advanced turbo prop have been studied as a way to increase the bypass ratio while keeping the fan diameter, when a fan blade is damaged for any reason, there arise problems of noise and difficulty in securing the airworthiness for preventing fragments of the fan blade from colliding with the aircraft body and damaging it.

When increasing the fan diameter and bypass ratio as described above, the increase in weight of the fan case/nacelle, the enlargement of the main landing gears, and the degradation of the efficiency of the low-pressure turbines bring about significantly negative effects.

SUMMARY OF THE INVENTION

The present invention has been contrived in view of such problems of the prior art, and an object of the present invention is to provide a high bypass-ratio turbofan jet engine which is capable of increasing the bypass ratio without increasing the fan diameter, and of reducing air resistance acting on the engine.

In order to achieve the abovementioned object, there is provided a high bypass-ratio turbofan jet engine described in claim 1, which is a turbofan jet engine having: a core engine that generates a propulsive force by ejecting combustion gas rearward; and a fan that generates a propulsive force by ejecting an airflow rearward while compressing the airflow, and suppresses a noise of an exhaust stream of the core engine, wherein the fan is configured by a front fan disposed in the vicinity or upstream of a compressor of the core engine, and an aft fan disposed in the vicinity or downstream of a turbine, and wherein a front fan duct that discharges air compressed by the front fan to the outside and an aft fan duct that introduces air into the aft fan are disposed along the core engine such as to change cross-sectional shapes of the front fan duct and the aft fan duct by rotating around the core engine.

In this manner, the two fan ducts can be disposed independently (without mixing fluids therein) without protruding the fan ducts outward from the engine when viewing the front cross section of the engine, the engine being configured by air intakes of two fans. Also, the cross-sectional geometric relationship between the front fan duct and the aft fan duct can be converted to a desired geometric relationship in any two axial direction positions of the engine, e.g., a position immediately posterior to the front fan and a position immediately anterior to the aft fan. For example, in the position immediately posterior to the front fan, when the front fan duct is positioned in the center of the engine and the aft fan duct is positioned therearound, appropriate disposition of the ducts allows the conversion of the cross sections so that the aft fan duct is positioned in the center of the engine and the front fan duct is positioned therearound. As a result, the air intake of the front fan and the air intake of the aft fan can be disposed appropriately so that low air resistance acts on the engine. By configuring the front fan duct and the aft fan duct in the manner described above, the bypass ratio can be increased significantly without increasing the diameters of the fans. Note that "geometric relationship" described above means "cross relationship" characterized by the position, shape and size of the two ducts at the cross section of the body of the entire engine.

In the high bypass-ratio turbofan jet engine described in claim 2, the front fan duct and the aft fan duct are disposed along the core engine such as to change the cross-sectional shapes of the front fan duct and the aft fan duct by rotating around the core engine, so that a cross-sectional geometric relationship between the front fan duct and the aft fan duct at a position immediately posterior to the front fan and a cross-sectional geometric relationship between the front fan duct and the aft fan duct at a position immediately anterior to the aft fan are inverted.

In the above turbofan jet engine, the two fan ducts can be disposed independently (without mixing the fluids therein) by configuring the front fan duct and the aft fan duct in the manner described above.

In the high bypass-ratio turbofan jet engine described in claim 3, the front fan duct and the aft fan duct are disposed along the core engine such as to change the cross-sectional shapes of the front fan duct and the aft fan duct by rotating around the core engine, so that the cross-sectional area of a body of all or part of the engine is kept constant.

By configuring the front fan duct and the aft fan duct in the manner described above, the above turbofan jet engine can be configured by a straight body structure where the cross-sectional area of the engine is constant.

In the high bypass-ratio turbofan jet engine described in claim 4, an air intake of the front fan is provided in the center of a front face of the engine, while an air intake of the aft fan is provided on each side or only one side of the front fan with respect to a horizontal direction of the entire engine, and the air intakes of the entire engine are each formed into an elliptical shape which is elongated in a horizontal direction and compressed in a vertical direction.

By configuring the air intake of the front fan and the air intake of the aft fan as described above in the above turbofan jet engine, it is not necessary to make the main landing gears long even if additional aft fan is provided and the bypass ratio is increased, because the distance between the engine and the ground is not reduced.

In the high bypass-ratio turbofan jet engine described in claim 5, the air intake of the front fan and the air intake of the aft fan are embedded in a main wing with a distance between the air intakes.

In the above turbofan jet engine, air resistance acting on the engine, or air resistance acting on the entire fuselage, can be reduced by configuring the air intake of the front fan and the air intake of the aft fan in the manner described above. Consequently, the bypass ratio can be increased without increasing the air resistance acting on the aircraft.

According to the high bypass-ratio turbofan jet engine of the present invention, the following effects are expected:

(1) Since the engine of the present invention has the two fans, the front fan and the aft fan, the bypass ratio can be increased significantly, compared to the conventional turbofan jet engine having a single fan.

(2) In a single fan engine having the same bypass ratio as the engine of the present invention, the root of each moving blade needs to be thickened due to the large fan diameter and increased centrifugal force acting on the fan. It is also necessary to reinforce the fan case for holding a removed moving blade in the engine and to increase the size of the nacelle. On the other hand, due to the two small-diameter fans of the engine of the present inventions, the engine can be made light and generate low resistance because the root of each moving blade can be made thinner than that of the single fan, the fan case can have a simpler configuration than that of the single engine, and the size of the nacelle can be reduced.

(3) Unlike the ultra-high bypass ratio engine of the single fan, the engine of the present invention hardly causes a mismatch between the rotation speed of the fan and the rotation speed of the turbines and thus can operate the fan and the turbines at more appropriate rotation speed. Therefore, the efficiency of the present invention can be improved.

In addition, the front fan duct and the aft fan duct are disposed along the core engine such as to change the cross-sectional shapes of the front fan duct and the aft fan duct by rotating around the core engine.

(4) Therefore, the cross-sectional shape of the body of the engine can be formed into an elliptical shape and the distance between the engine and the ground can be kept long even when the engine is installed beneath each wing.

(5) Moreover, the engine can be configured to have the straight body structure where air resistance acting on the engine can be reduced.

DESCRIPTION OF THE PREFERRED EMBODIMENTS

Figure 1:
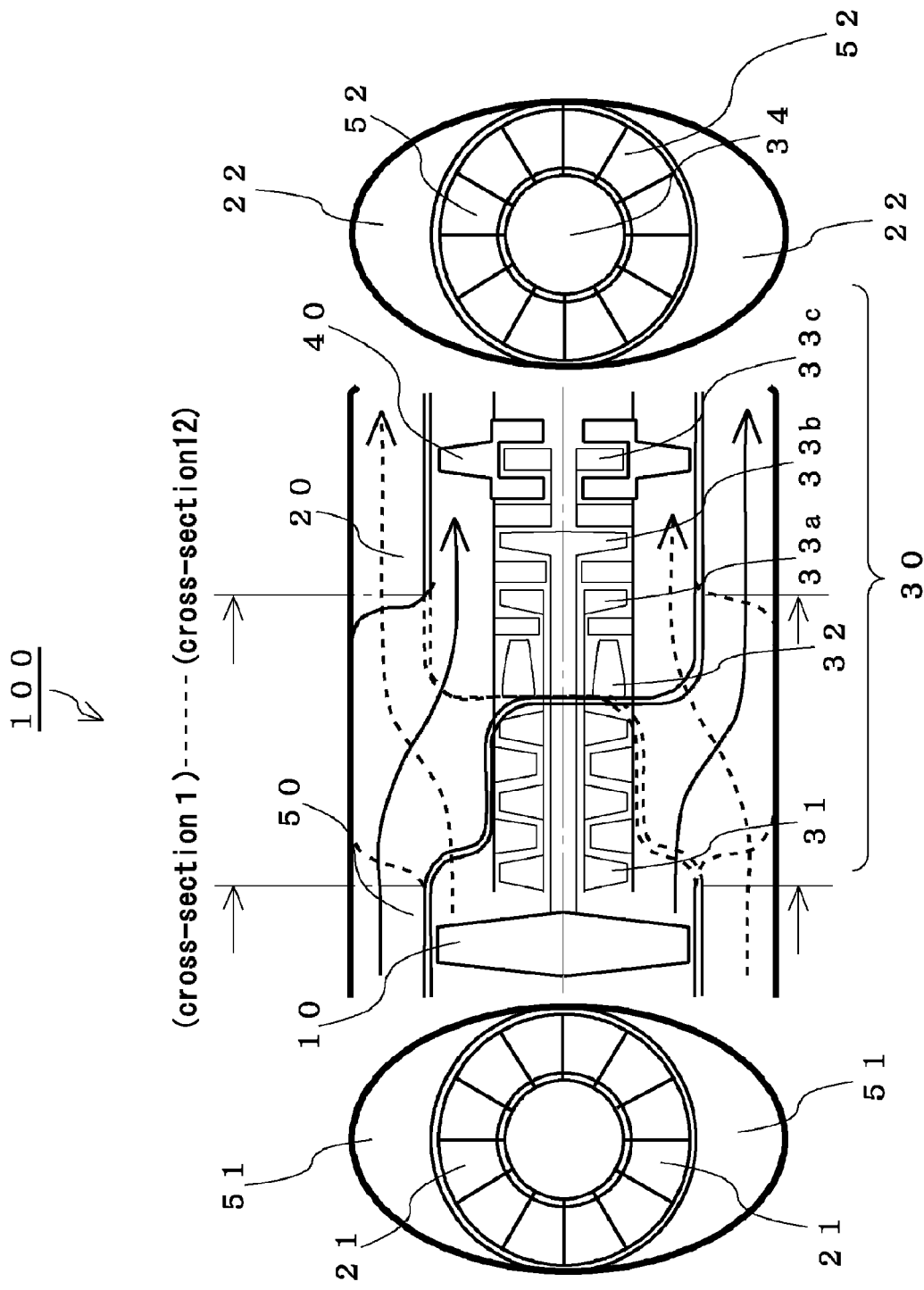
FIG. 1 is an explanatory diagram showing a turbofan jet engine according to Embodiment 1 of the present invention.

The present invention will now be described hereinafter in detail based on the embodiments shown in the drawings.

Embodiment 1

FIG. 1 is an explanatory diagram showing a turbofan jet engine 100 according to Embodiment 1 of the present invention. For the convenience of explanation, the turbofan jet engine 100 is illustrated in the shape of a vertically long ellipse, but this engine is actually in the shape of a horizontally long ellipse.

This turbofan jet engine 100 has: a core engine 30 constituted by a compressor 31, a combustor 32, turbines 33 and an exhaust nozzle 34; a front fan 10 which is positioned upstream of the core engine; a front fan duct 20 which leads air compressed by the front fan 10 but bypassing the core engine to the outside; and aft fan 40 which is positioned downstream of the core engine; and an aft fan duct 50 which introduces the air into the aft fan 40.

Although described in detail later with reference to FIG. 2, the front fan duct 20 and the aft fan duct 50 are disposed along the core engine 30 such as to change the cross-sectional shapes of the front fan duct 20 and the aft fan duct 50 by rotating around the core engine 30, and are configured such that the geometric relationship of cross-section 1 immediately posterior to the front fan 10 and the geometric relationship of cross-section 11 immediately anterior to the aft fan 40 are inverted. With this configuration, the straight body structure having a constant cross-sectional area of the entire engine can be realized.

When the entire engine is viewed from front, the inlet of the front face of the engine is formed into a horizontally long elliptical shape in which air intakes 21 of the front fan 10 are disposed in the center and an air intake 51 of the aft fan 40 is disposed on each outside of the front fan 10. Without changing the size of this outer shape, the outlet end of the rear face of the engine is formed into a horizontally long elliptical shape in which the exhaust nozzle 34 of the core engine 30 is disposed in the center, an exhaust nozzles 52 of the aft engine 40 are disposed around the exhaust nozzle 34, and an exhaust nozzle 22 of the front fan 10 is disposed on each outside of the exhaust nozzles 52.

The front fan 10 is connected directly by a low-pressure rotation shaft to a first low-pressure turbine 33b disposed in the subsequent stage of a high-pressure turbine 33a, and is driven by the first low-pressure turbine 33b. The compressor 31 is driven by the high-pressure turbine 33a.

The aft fan 40 is connected directly to an end part of an outer circumference of a moving blade of a second low-pressure turbine 33c. Therefore, the aft fan 40 is configured to be driven in complete synchronization with the rotation of the second low-pressure turbine 33c.

Figure 2:
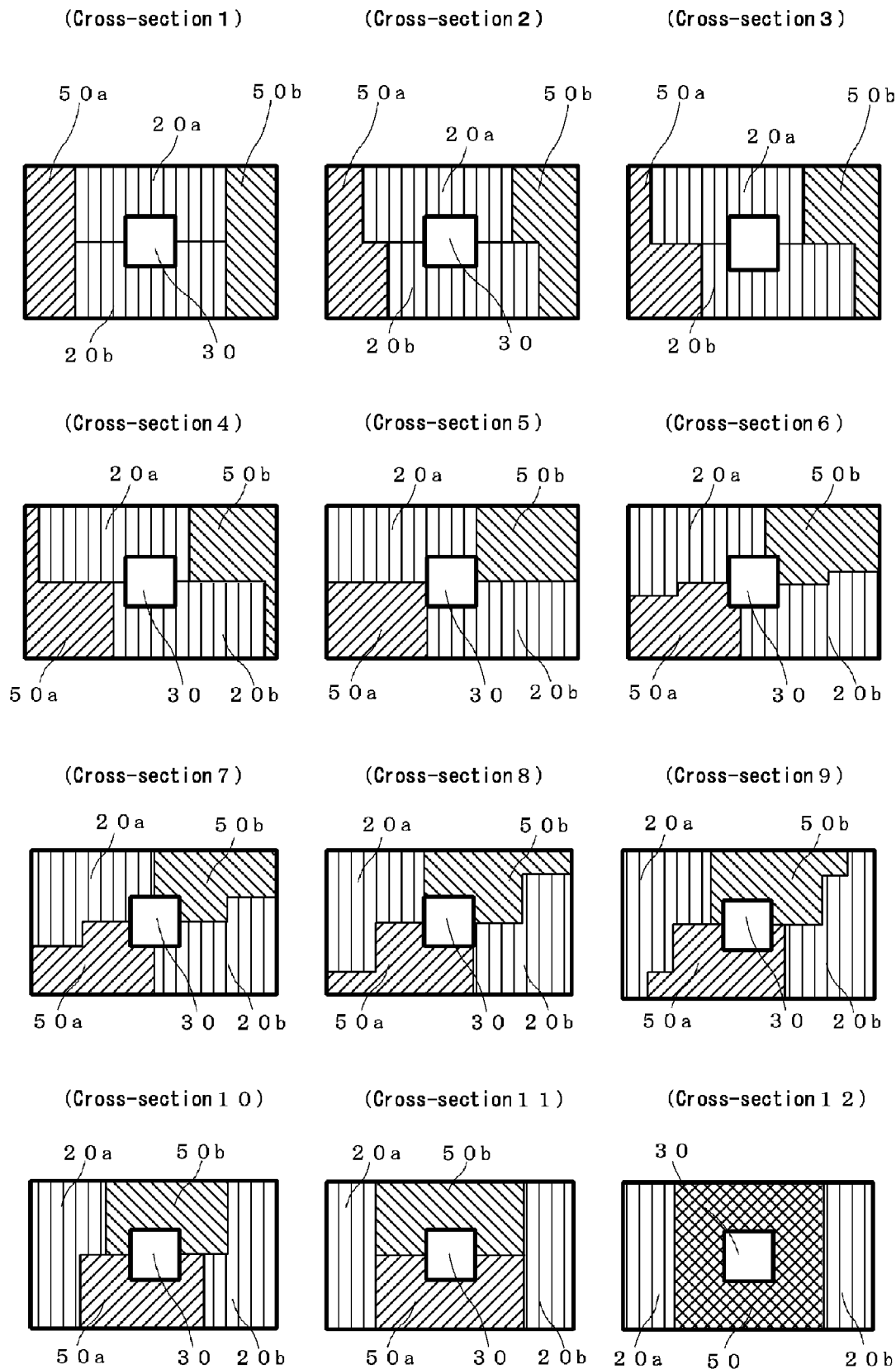
FIG. 2 is an explanatory diagram showing an example of how the cross-sectional shapes of a front fan duct and of an aft fan duct change from cross-section 1 to cross-section 12 of FIG. 1.

FIG. 2 is an explanatory diagram showing an example of how the cross-sectional shapes of the front fan duct 20 and of the aft fan duct 50 change from cross-section 1 to cross-section 12 of FIG. 1. For the convenience of explanation, the cross-sectional shapes are illustrated in a substantially rectangular shape, but the actual cross-sectional shape of each duct has a smooth shape with low aerodynamic loss.

As shown in FIG. 1, cross-section 1 is the cross section of a front fan outlet part, and cross-section 12 is the cross section of an aft fan inlet part. Cross-sections 2 to 11 are obtained by sequentially cutting the section therebetween.

First of all, as shown in cross-section 1, the front fan duct 20 is divided into two upper and lower parts to form front fan ducts 20a, 20b. Aft fan ducts 50a, 50b serving as side inlets for introducing an air flowing toward the aft fan are formed on both sides of the front fan duct 20. Specifically, the air aspirated by these two fans is divided into four independent airflows, except for the air introduced into the core engine 30. The four airflows flow through the front fan duct 20 and the aft fan duct 50 and are discharged to the circumference around combustion gas ejected from the core engine 30, without being mixed with one another.

In cross-section 2 to cross-section 12, as viewed from the upstream side, the front fan ducts 20a, 20b and aft fan ducts 50a, 50b change their positions, shapes and size gradually in a counterclockwise direction around the core engine 30 by moving toward the downstream side. Note that the outer shape of the entire engine is kept constant. Namely, the engine has the straight body structure where air resistance is low.

The front fan ducts 20a and 20b may be integrated to configure a single duct in cross-section 1 to cross-section 4.

The front fan ducts 20a, 20b that are positioned in the center (circumference of the core engine 30) in cross-section 1 are located outside the core engine 30 in cross-section 11. On the other hand, the aft fan ducts 50a, 50b that are positioned outside the core engine 30 in cross-section 1 are located in the center in cross-section 11. More specifically, the geometric relationships of the front fan ducts 20a, 20b to the aft fan ducts 50a, 50b shown in cross-section 1 and cross-section 11 are inverted.

The aft fan ducts 50a and 50b may be integrated to configure a single duct in cross-section 9 to cross-section 12.

As described above, the front fan duct 20 and the aft fan duct 50 are disposed along the core engine 30 such as to change the cross-sectional shapes of the front fan duct 20 and the aft fan duct 50 by rotating around the core engine 30 in the counterclockwise direction, and are configured such that the geometric relationship of cross-section 1 immediately posterior to the front fan 10 and the geometric relationship of cross-section 11 immediately anterior to the aft fan 40 are inverted. With this configuration, the straight body structure having a constant cross-sectional area of the entire engine can be realized.

Figure 3:
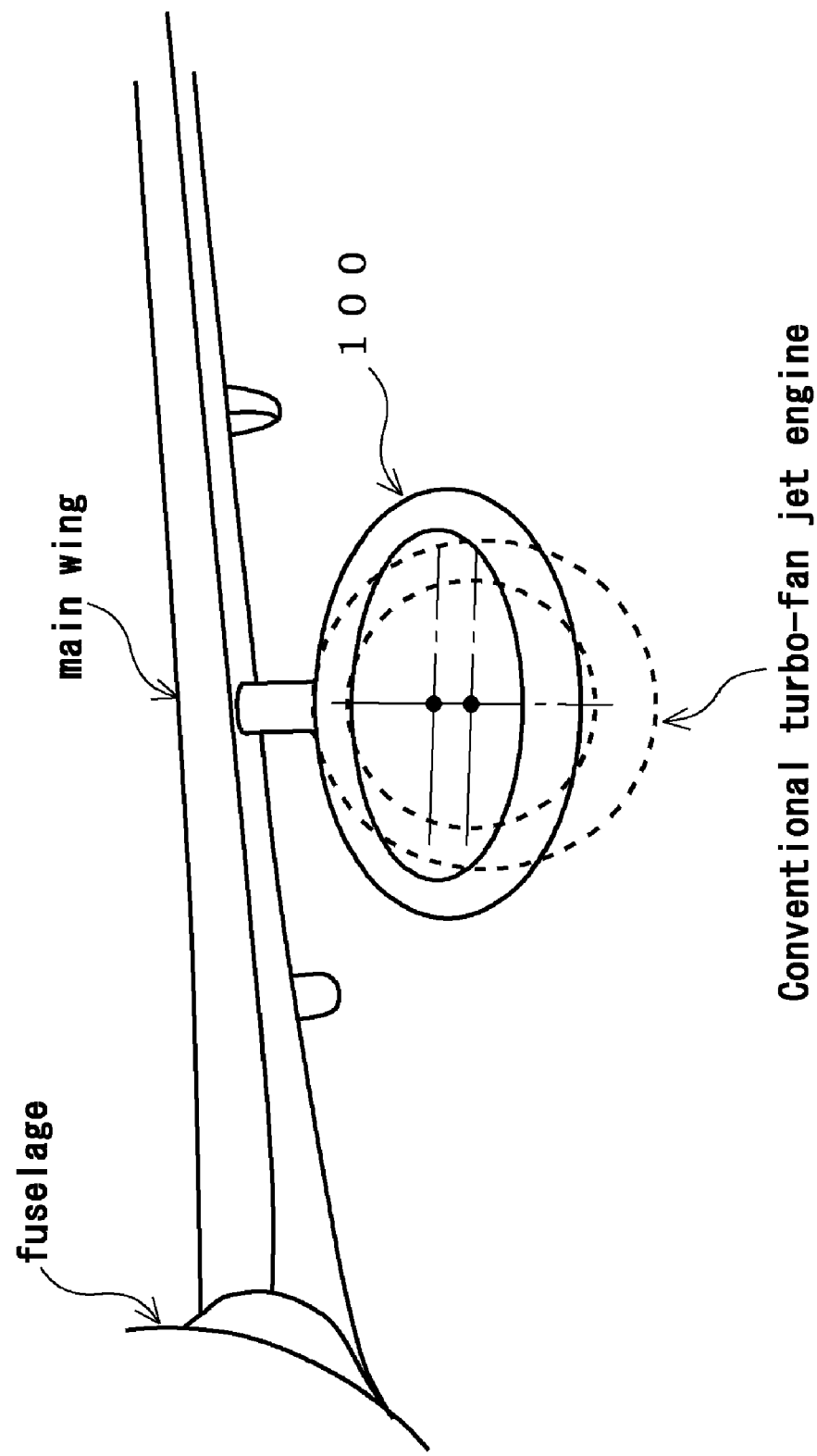
FIG. 3 is an explanatory diagram showing an example of installation of the turbofan jet engine of Embodiment 1 of the present invention to aircraft.

FIG. 3 is an explanatory diagram showing an example of installation of the turbofan jet engine 100 of Embodiment 1 to aircraft. Note that there is also described, as a comparative example, a conventional turbofan jet engine having a thrust level and bypass ratio substantially equal to those of the turbofan jet engine 100.

As is clear from FIG. 3, because vertical length of the turbofan jet engine 100 of the present invention is shorter than that of the conventional turbofan jet engine, a long distance can be secured between the engine and the ground. Therefore, the length of the main landing gears and the weight of the entire fuselage can be reduced.

Embodiment 2

Figure 4:
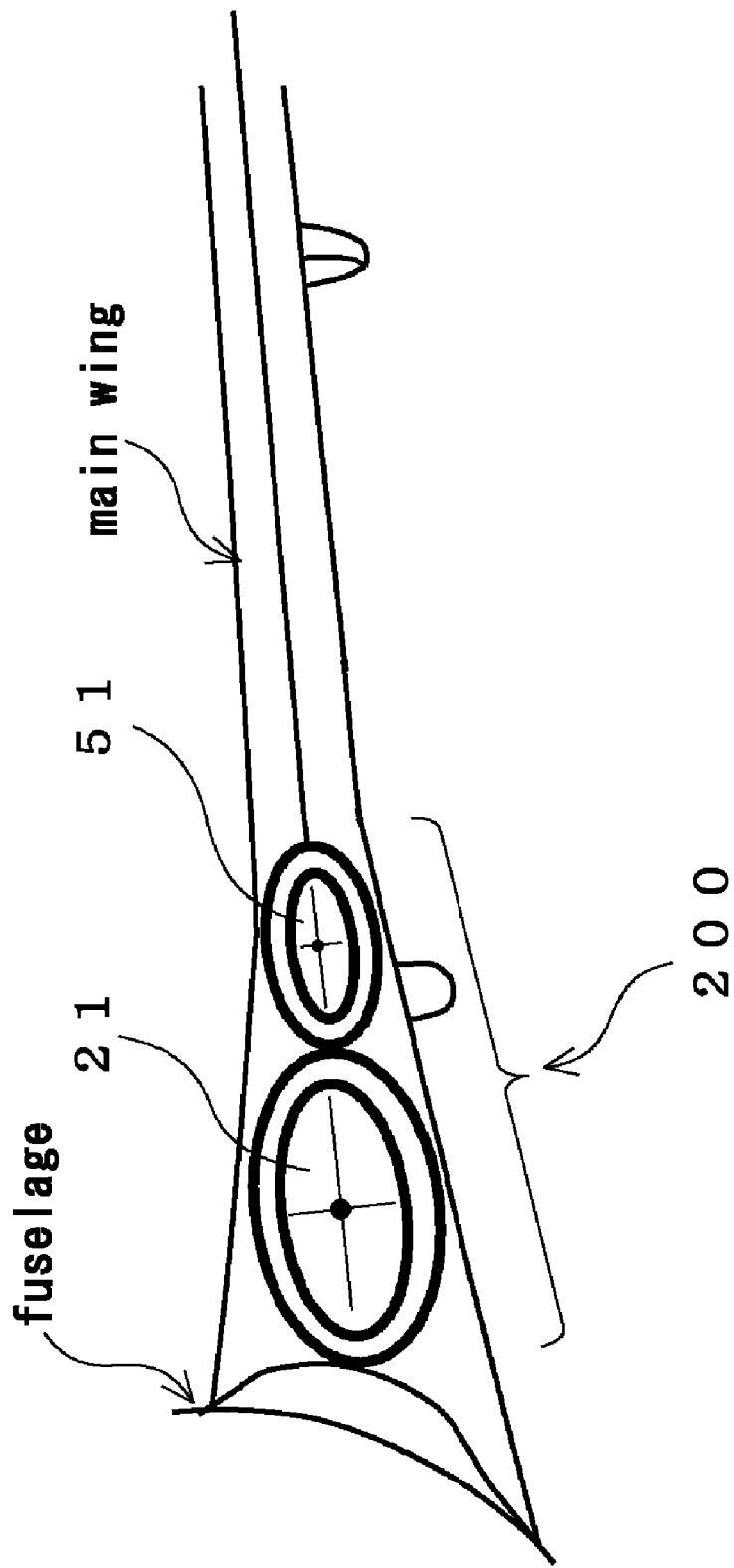
FIG. 4 is an explanatory diagram showing a turbofan jet engine according to Embodiment 2 of the present invention.

FIG. 4 is an explanatory diagram showing a turbofan jet engine 200 according to Embodiment 2.

This entire turbofan jet engine 200 is embedded in a main wing. Also, when viewing the aircraft from front, the air intake 21 of the front fan 10 and the air intake 51 of the aft fan 40 are independently provided away from each other.

Figure 5:
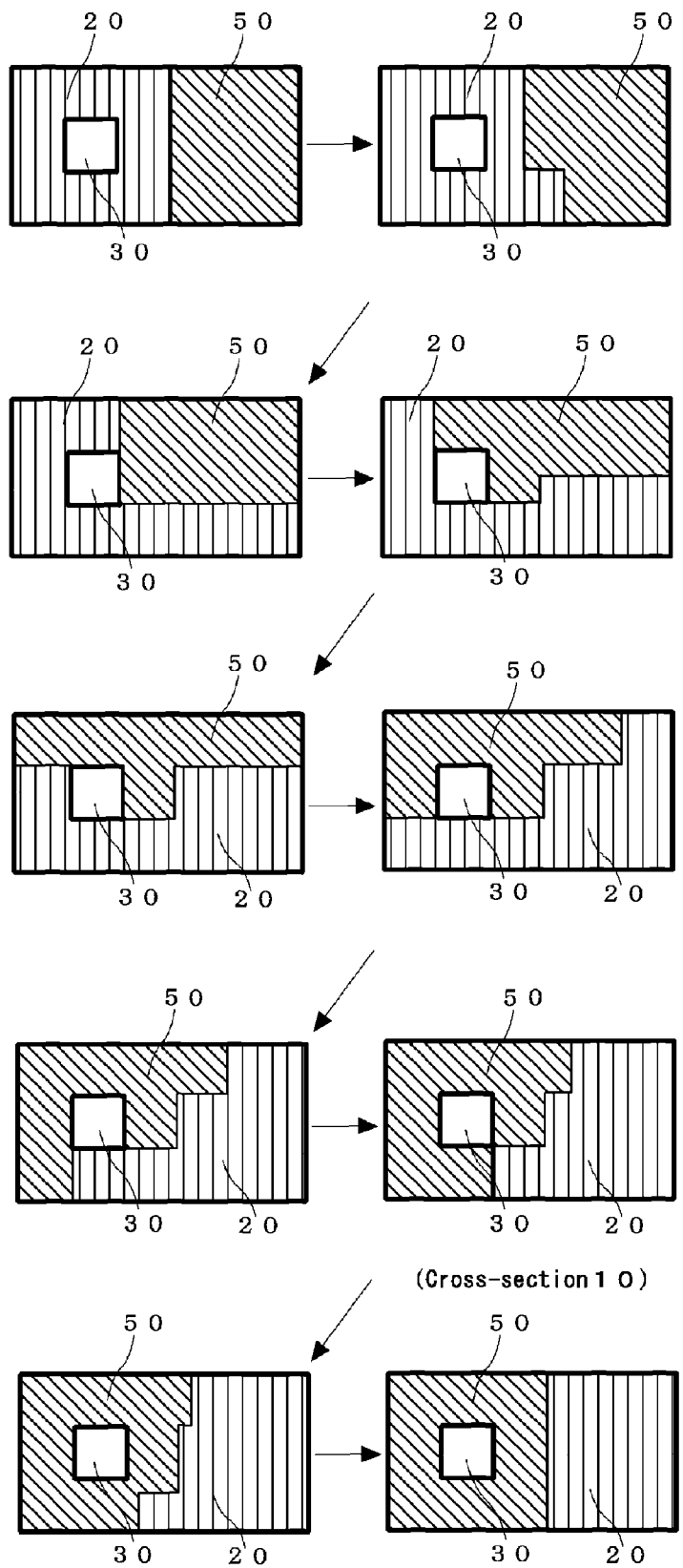
FIG. 5 is an explanatory diagram showing an example of how the cross-sectional shapes of a front fan duct and of aft fan duct of Embodiment 2 change.

FIG. 5 is an explanatory diagram showing an example of how the cross-sectional shapes of the front fan duct 20 and of aft fan duct 50 of Embodiment 2 change.

As with the case of Embodiment 1, as viewed from the upstream side, the front fan duct 20 and aft fan duct 50 change their positions, shapes and size gradually in a counterclockwise direction around the core engine 30 by moving toward the downstream side. Note that the sum of the cross-sectional area of the front fan duct 20 and the cross-sectional area of the aft fan duct 50 may be constant as in Embodiment 1, or may be changed without having these ducts protrude from the main wing. In either case, the cross sections of the ducts change smoothly.

As with Embodiment 1, in Embodiment 2 the front fan duct 20 and the aft fan duct 50 are disposed along the core engine 30 such as to change the cross-sectional shapes of the front fan duct 20 and the aft fan duct 50 by rotating around the core engine 30 in the counterclockwise direction, and are configured such that the geometric relationship of cross-section 1 immediately posterior to the front fan 10 and the geometric relationship of cross-section 10 immediately anterior to the aft fan 40 are inverted. With this configuration, the straight body structure having a constant cross-sectional area of the engine can be realized.

The turbofan jet engine of the present invention can be applied to an aircraft turbofan jet engine, and particularly to a propulsion jet engine for aircraft cruising at subsonic speeds.

We claim:

1. A high bypass-ratio turbofan jet engine, comprising:
  a core engine that generates a propulsive force by ejecting combustion gas rearward; and
  a fan that generates a propulsive force by ejecting an airflow rearward while compressing the airflow, and suppresses a noise of an exhaust stream of the core engine,
  wherein the fan includes a front fan disposed in the vicinity or upstream of a compressor of the core engine, and an aft fan disposed in the vicinity or downstream of a turbine, and
  wherein a front fan duct that discharges air compressed by the front fan to the outside and an aft fan duct that introduces air into the aft fan are disposed along a longitudinal direction of the core engine in such a manner to spirally twist relative to each other such that cross-sectional shapes of the front fan duct and the aft fan duct change relative to each other by rotating around the core engine in one direction.

2. The high bypass-ratio turbofan jet engine according to claim 1, wherein the front fan duct and the aft fan duct are disposed along the core engine such as to change the cross-sectional shapes of the front fan duct and the aft fan duct by rotating around the core engine, so that a cross-sectional geometric relationship between the front fan duct and the aft fan duct at a position immediately posterior to the front fan and a cross-sectional geometric relationship between the front fan duct and the aft fan duct at a position immediately anterior to the aft fan are inverted.

3. The high bypass-ratio turbofan jet engine according to claim 1 or 2, wherein the front fan duct and the aft fan duct are disposed along the core engine such as to change the cross-sectional shapes of the front fan duct and the aft fan duct by rotating around the core engine, so that the cross-sectional area of a body of all or part of the engine is kept constant with respect to the longitudinal direction of the core engine.

4. The high bypass-ratio turbofan jet engine according to claim 1, wherein an air intake of the front fan is provided in the center of a front face of the engine, while an air intake of the aft fan is provided on each side or only one side of the front fan with respect to a horizontal direction of the entire engine, and the air intakes of the entire engine are each formed into an elliptical shape which is elongated in a horizontal direction and compressed in a vertical direction.

5. The high bypass-ratio turbofan jet engine according to claim 4, wherein the air intake of the front fan and the air intake of the aft fan are embedded in an aircraft wing with a distance between the air intakes.

* * * * *